United States Patent [19]

Sommer

[11] 4,356,900
[45] Nov. 2, 1982

[54] DRIVE SYSTEM

[75] Inventor: Gordon M. Sommer, Boca Raton, Fla.

[73] Assignee: Sommer Co., Warren, Mich.

[21] Appl. No.: 168,538

[22] Filed: Jul. 14, 1980

[51] Int. Cl.³ ............................................. B60K 41/02
[52] U.S. Cl. ............................ 192/0.02 R; 192/0.033; 192/0.098; 192/87.13; 192/103 R
[58] Field of Search ............ 192/0.02 R, 0.075, 0.096, 192/0.098, 3.58, 48.7, 51, 87.13, 87.1, 0.033, 103 R, 103 C; 251/133, 135

[56] References Cited

U.S. PATENT DOCUMENTS

| | | | |
|---|---|---|---|
| 2,875,634 | 3/1959 | Gelenius et al. | 192/0.096 |
| 3,209,871 | 10/1965 | Moericke | 192/0.096 |
| 3,258,985 | 7/1966 | Jordan | 192/0.02 R |
| 3,756,282 | 9/1973 | Knutson | 251/133 |
| 4,133,511 | 1/1979 | Hartmann et al. | 251/133 |
| 4,154,425 | 5/1979 | Smith | 251/133 |
| 4,267,914 | 5/1981 | Saar | 192/147 |

FOREIGN PATENT DOCUMENTS 701630  12/1953  United Kingdom .

Primary Examiner—George H. Krizmanich
Attorney, Agent, or Firm—Harness, Dickey & Pierce

[57] ABSTRACT

An improved heavy duty motor clutch drive system is disclosed which includes a motor adapted to be drivingly connected to apparatus to be driven by means of a clutch unit of the oil shear type which may be selectively actuated by application of fluid pressure. Improved electrically actuated control valve means are provided for controlling the application of actuating fluid pressure to the clutch unit and includes associated control circuitry for operating the control valve so as to accelerate the driven apparatus in a predetermined manner. Additionally, in some applications a plurality of such drive systems may be utilized to drive a common apparatus in which case the clutch actuating controls may be interconnected so as to provide progressive predetermined delay actuation of the various clutch units. Safety override means are also incorporated into the control circuitry which are designed to deactuate the clutch unit so as to disconnect the motor from the driven apparatus in response to abnormal operating conditions.

27 Claims, 7 Drawing Figures

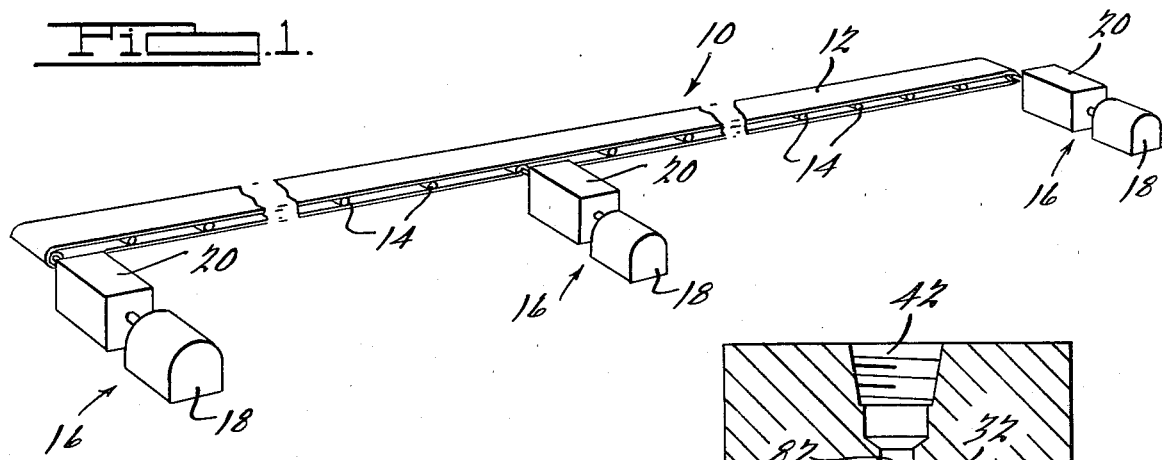
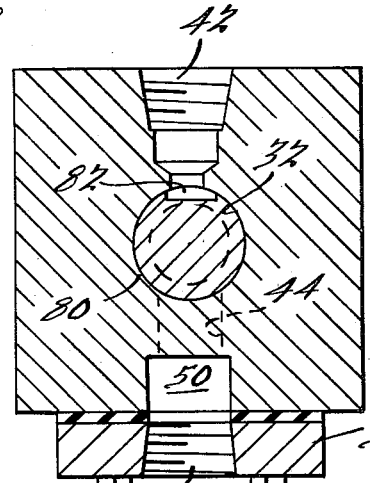
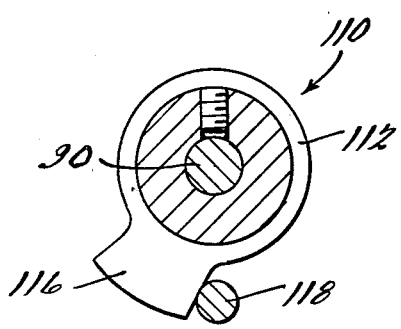
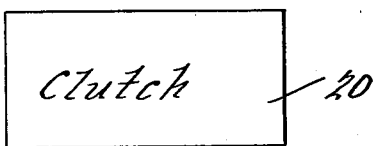
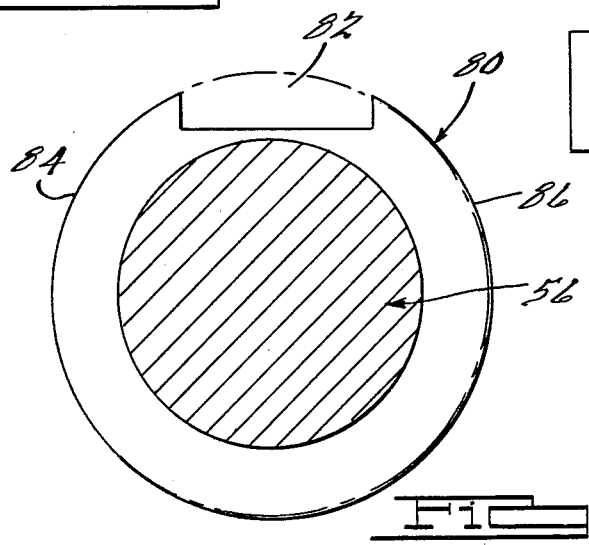

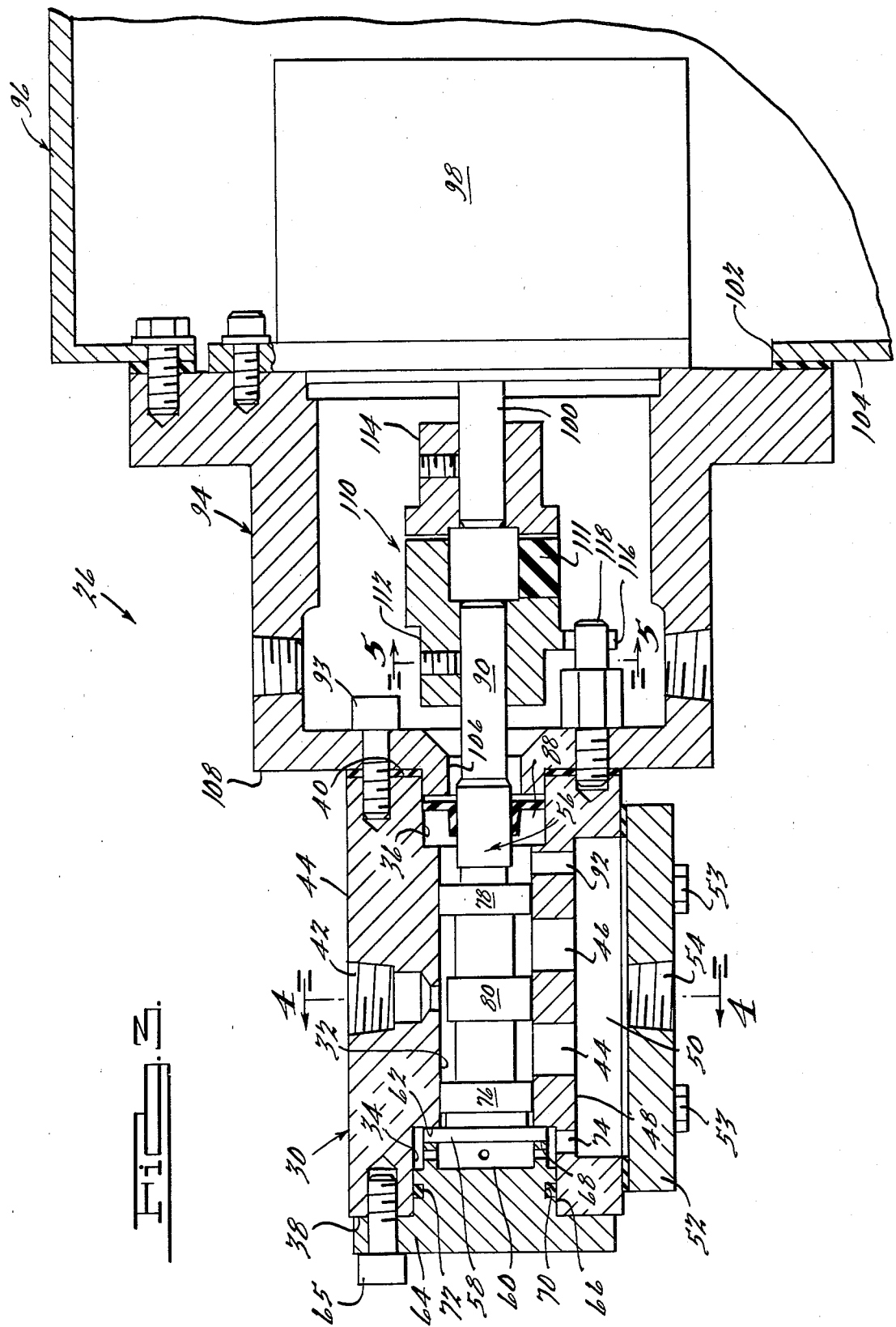

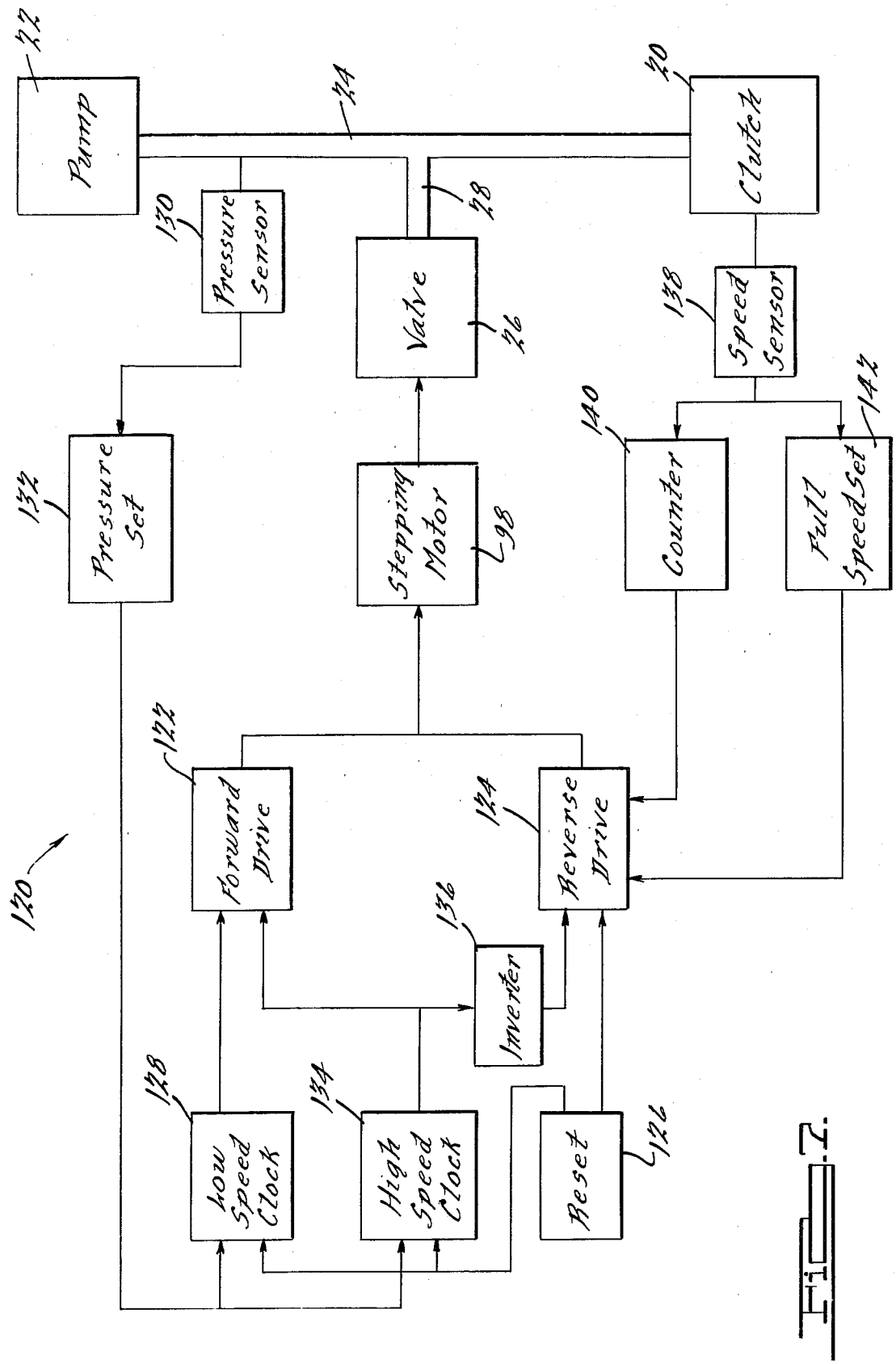

DRIVE SYSTEM

BACKGROUND AND SUMMARY OF THE INVENTION

The present invention relates generally to motor clutch drive systems and more specifically to such drive systems which include fluid actuated oil shear type clutch units for operatively connecting a driving motor to apparatus to be driven thereby and associated control apparatus for selectively controlling the application of actuating fluid to the clutch unit.

In numerous applications it is highly desirable to be able to smoothly accelerate a driven apparatus from a static condition to full operating speed without subjecting the apparatus to the often excessive stress and strain associated with an uneven or abrupt start. Counteracting this desire to achieve a smooth gradual startup of the driven apparatus is the desire to achieve full speed operation as rapidly as possible as well as the desire to avoid any excessive wear resulting from unnecessarily prolonged slippage of the clutch unit as it is being engaged.

Additionally, smooth startups may be particularly desirable in apparatus having multiple spaced drives provided thereon such as for example overland conveyor systems utilized in various types of mining operations so as to avoid shifting or spillage of the load thereon as well as to avoid excessive tensioning of the conveyor belt and the potential backlash which may result. In such conveyor systems it is normally necessary to progressively start the various drives in succession with a slight delay between each successive start so as to enable the sections of conveyor belt between each of the drives to be properly tensioned. The application of driving forces by proper clutch actuation so as to achieve a soft start enables the conveyor belt to tension in a generally even manner whereby any backlash or rebounding thereof is minimized. In order to insure such proper tensioning of the conveyor system, it is important that the acceleration curves of each drive unit be consistent, predictable and very accurately controllable.

Additionally, because the clutch actuating controls must be located in close proximity to the drive units and hence the conveyor equipment, they are subjected to extremely adverse operating conditions due to the high level of contaminants in the surrounding atmosphere. This problem is particularly prevalent in systems used for transporting coal both at the mines and at coal fired power plants. As a result, problems have been encountered as a result of dirt contamination of clutch actuating fluid causing plugging of control valves thereby resulting in loss of full operating control as well as increased maintenance cost and equipment downtime. Therefore, it is highly desirable to provide control valving which is substantially less sensitive to such dirt contamination.

The present invention provides a drive system particularly well suited for providing very smooth and yet rapid acceleration of driven apparatus both in terms of single and multiple drive units. The drive system includes an improved cam type control valve which is extremely resistant to operation degradation as a result of contaminants in the actuating fluid and which operates reliably to apply actuating fluid to the clutch unit in accordance with a predetermined profile so as to smoothly bring the driven apparatus up to full operating speed within a minimum amount of time and with a minimum amount of clutch slippage. The control valve is designed to be driven through a plurality of steps by a stepping motor and associated control circuitry whereby a cam member is selectively positioned with respect to an inlet orifice so as to progressively restrict fluid flow through the valve unit which in turn will result in increased actuating fluid pressure being applied to activate the clutch unit. The combination of this cam type rotary control valve with the stepping motor drive arrangement provides an extremely accurate and reliable control for actuation of the clutch unit which is substantially self-cleaning so as to substantially reduce degredation of operation as a result of contaminants in the actuating fluid.

Control circuit means are also provided for controlling the operation of the stepping motor so as to enable precise control of the equipment startup and acceleration profile. The control circuit means allows the rate of acceleration to be easily adjusted to accommodate particular operating conditions and once set will insure repeatability of the acceleration rate. Additionally, provisions may also be included in the circuit means to disengage or deactuate the clutch unit in the event of abnormal operating conditions particularly during the startup period so as to prevent damage to the clutch unit such as may occur from excessive slippage thereof.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of an overland conveyor system incorporating a plurality of motor clutch drive system which include improved control means all in accordance with the present invention;

FIG. 2 is a schematic diagram of a clutch unit and associated control valve connected in circuit with pump means in accordance with the principles of the present invention;

FIG. 3 is a sectioned view of a control valve for use in the drive system shown in FIG. 1 all in accordance with the present invention, the section being taken along a radial plane extending parallel to the axis of rotation of the valve unit;

FIG. 4 is a sectioned view of the valve assembly of FIG. 3, the section being taken along line 4—4 thereof;

FIG. 5 is an enlarged fragmentary section view of the cam member forming a part of the valve assembly of FIG. 3;

FIG. 6 is a transverse section view of the valve assembly of FIG. 3 showing the stop arrangements incorporated therein, the section being taken along line 5—5 thereof; and FIG. 7 is a block diagram of the control circuit used to operate the stepping motor which operates to drive the control valve shown in FIG. 3, all in accordance with the present invention.

DESCRIPTION OF THE PREFERRED EMBODIMENT

Referring now to the drawings and in particular to FIG. 1, there is shown an overland conveyor system 10 which includes a rather long conveyor belt 12 movably supported on a plurality of roller means 14 and including a plurality of driving means 16 spaced along the length of the conveyor system. As shown, each of the drive means includes a motor means 18 such as for example an internal combustion engine or electric motor which is operatively connected to a clutch unit 20 which operates to selectively transmit the driving forces from the motor means 18 to the conveyor belt 12. Such conveyor systems may range in length from several hundred feet to several miles depending on the particular application.

Clutch units 20 are preferably of the oil shear type such as disclosed in U.S. Pat. No. 3,696,898, issued Oct. 10, 1972 and U.S. Pat. No. 4,171,038, issued Oct. 16, 1979 and assigned to the assignee of the present invention, the disclosures of which are hereby incorporated by reference. Such clutch units comprise a plurality of alternating discs and plates, the discs being secured for rotation with one of the input and output shafts of the clutch and the plates being secured for rotation with the other of said input and output shafts. An actuating cylinder is normally provided to which pressurized fluid such as an oil for example is supplied which operates to move the alternating discs and plates into mutual operative relationship whereby the driving force of the motor means may be transmitted to the output shaft so as to drive the apparatus connected thereto. The construction and operation of the clutch is described more fully in the above referenced patent.

In order to control actuation of clutch unit 20 and hence provide a smooth "soft" start of the conveyor system or other apparatus being driven, pump means 22 are provided as shown diagrammatically in FIG. 2 which are operative to provide a supply of pressurized fluid from a reservoir (not shown) to the clutch unit 20 via conduit 24 so as to enable actuation of the clutch unit 20. In operation, the pump means may be continuously operated so as to provide lubrication and cooling fluid to the clutch with only a portion of the output being used for control purposes. Alternatively, separate pump means may be provided for control purposes. In either event, the pump means is first started so as to create a source of pressurized fluid and a pressure relief control valve assembly 26 is provided being connected to conduit 24 by conduit 28 and which operates to allow fluid output from the pump means 22 to be directed therethrough back to a reservoir when in a fully open position so as to substantially prevent any actuating pressure being applied to the clutch unit 20. As the valve assembly 26 closes, fluid flow therethrough will be progressively restricted thereby resulting in increasing actuating fluid pressure being applied to the clutch unit 20. As this fluid actuating pressure is progressively increased, the plates and discs of the clutch unit will be progressively moved axially into torque transmitting relationship with relative rotation therebetween being progressively decreased until such time as the output shaft is being rotated at full operating speed.

Referring now to FIGS. 3 through 6, a pressure relief control valve assembly 26 in accordance with the present invention is illustrated and includes an elongated generally rectangular shaped housing 30 having a central bore 32 extending longitudinally therethrough which includes enlarged diameter portions 34 and 36 at opposite ends 38 and 40 thereof respectively. An inlet opening 42 is provided in the upper sidewall 44 which opens radially inwardly into bore 32 and which is adapted to have a fluid supply line connected thereto such as conduit 28 shown in FIG. 2. A pair of radially extending outlet openings 44 and 46 are also provided on the lower sidewall 48 of housing 30 being substantially equally longitudinally spaced in opposite directions from inlet opening 42. Outlet openings 44 and 46 each open into a manifolding cavity 50 formed in the lower sidewall 48 of housing 30. A plate 52 is secured by suitable fasteners 53 to the lower sidewall 48 of housing 30 which in part defines and encloses manifolding cavity 50 and has a single outlet opening 54 provided therein which is adapted to have a fluid supply line connected thereto for returning actuating fluid to the reservoir.

An elongated rotatable valve core member 56 is movably positioned within longitudinally extending bore 32 and includes an enlarged diameter flange portion 58 adjacent the outer end 60 which engages a radially extending flange portion 62 interconnecting bore 32 and enlarged diameter portion 34 so as to axially position valve core member 56 with respect to housing 30. A retaining plate 64 is secured by suitable fasteners 65 to the outer end 38 of housing 30 and has a portion 66 extending into enlarged diameter portion 34 of bore 32 and into engagement with the outer surface 68 of flange 58 so as to securely restrain valve core member against axial movement. An annular groove 70 is also provided on portion 66 within which suitable sealing means 72 such as an O-ring is positioned which sealingly engages the sidewall of enlarged diameter portion 34 thereby preventing leakage of fluid therefrom. An opening 74 is also provided in housing 30 extending radially outwardly from the lower part of enlarged diameter portion 34 and opening into cavity 50 which operates to allow actuating fluid accumulating within enlarged diameter portion 34 to be returned to the reservoir.

Valve core member 56 also has a pair of axially spaced bearing journals 76 and 78 adjacent opposite ends thereof which engage the sidewalls of the longitudinally extending bore 32 so as to rotatably support valve core member therein. A cam lobe 80 is also provided on valve core member 56 being positioned approximately midway between journals 76 and 78 and in radial alignment with inlet opening 42. As best seen with reference to FIGS. 4 and 5, cam lobe 80 has a notched portion 82 on the circumference thereof which is positionable in alignment with inlet opening 42 so as to allow substantially unrestricted full fluid flow therethrough when valve assembly 26 is in a fully open position. Cam lobe 80 also has a substantially uniform rise or increasing radius circumferential surface portion 84 extending in a counterclockwise direction from notch 82 as shown in FIG. 5 and through approximately 270° of rotation as measured from approximately the center line of notch 82 with the remaining circumferential surface portion 86 thereof being of substantially constant radius. In the embodiment shown, the total cam rise is approximately 0.09 of an inch although it should be noted that both the contour and total rise may be varied so as to provide any desired acceleration curve. For example, should an extremely gradual initial startup be desired, the cam lobe could be provided with a first more gentle rise portion followed by a steeper rise portion which would allow the driven equipment to be more rapidly accelerated after initial movement had begun. Other variations suitable for the particular application may easily be provided by selecting an appropriate cam lobe contour. The maximum radius circumferential surface portion 86 or cam lobe 82 is such that when valve core member 56 is rotated so as to position the maximum radius circumferential surface portion 86 in alignment with inlet opening 42, fluid flow into valve assembly 26 will be substantially eliminated. Suitable sealing means 88 are also positioned within enlarged diameter portion 36 through which end portion 90 of valve core member 56 extends outwardly of housing 30. Also, in order to prevent accumulation of fluid between journal 78 and sealing means 88, an opening 92 is provided extending radially outwardly from bore 32 and opening into manifolding cavity 50 so as to enable fluid to be returned to the reservoir.

As shown in FIG. 3, valve housing 30 is supportingly secured by means of a plurality of fastening means 93 to a coupling housing 94 which in turn is supportingly secured to a control housing 96. A stepping motor 98 and associated control circuitry described in greater detail below are disposed within control housing 96 with stepping motor 98 having a drive shaft 100 extending outwardly therefrom through opening 102 provided in sidewall portion 104 and into coupling housing 94. End portion 90 of valve core member 56 also projects into coupling housing 94 through an opening 106 provided in sidewall 108 thereof and is positioned in axial alignment with stepping motor drive shaft 100. Suitable coupling means 110 are provided for drivingly connecting end portion 90 of valve core member 56 to drive shaft 100 and includes a first portion 112 secured to end portion 90 and a second portion 114 secured to drive shaft 100. Coupling means 110 will preferably be of the type which utilizes a suitably resilient rubber or elastomeric composition bushing 111 positioned between overlapping axially extending arm segments provided on first and second portions 112 and 114 respectively. Such couplings are readily commercially available and hence further description thereof is believed unnecessary.

As best seen with reference to FIGS. 3 and 6, first portion 112 of coupling means 110 is provided with a radially outwardly extending arm 116 which is adapted to engage a stop member 118 projecting into the interior of coupling housing in substantially parallel spaced relationship to end portion 90 of valve core member 56 so as to limit the rotational movement of valve core member. In operation, arm 116 will be positioned relative to cam lobe 80 so as to position notch 82 in alignment with inlet opening 42 when arm 116 engages stop member 118 in a counterclockwise direction of rotation as shown in FIG. 6 and to position maximum radius circumferential surface portion 86 in alignment with inlet opening 42 when arm 116 engages stop member 118 in the opposite direction of rotation. The provision of rubber or elastomeric bushing 111 within coupling means 110 will operate to insulate stepping motor 98 from the shock encountered when arm 116 is driven against stop member 118.

Stepping motor 98 will preferably have a relatively large number of steps per revolution; on the order of 200 and has a relatively low torque output sufficient to rotate valve core member 56 but yet small enough to avoid any damage resulting from rotation against stop member.

A control circuit 120, as illustrated in block diagram in FIG. 7, is provided for controlling the operation of stepping motor 98 and hence pressure relief control valve assembly 26. Control circuit 120 includes both forward and reverse drive means 122 and 124 connected to stepping motor 98 which when actuated are operative to provide stepping pulses to drive stepping motor 98 in either clockwise (forward) or counterclockwise (reverse) directions. Circuit reset means 126 are provided which upon energization will operate to activate reverse drive means 124 so as to sequence stepping motor 98 through a full series of steps in a counterclockwise direction to insure valve core member 56 is positioned in the fully open or full bypass mode with the notch portion 82 of cam lobe 80 positioned in alignment with inlet opening 42 in valve housing 30 so as to thereby insure that no actuating fluid pressure is applied to the clutch unit 20.

When valve core member 56 is in this position, substantially the entire fluid output of pump means 22 will be pumped from a reservoir (not shown) through conduits 24 and 28 into valve inlet opening 42 across the valve core member 56 on both sides of cam lobe 80 through the two outlets 44 and 46 into manifolding cavity 50 and outlet opening 54 into a conduit which will return the fluid to the reservoir. Because notch portion 82 on cam lobe 80 of the valve core member 56 is positioned in alignment with inlet opening 42, fluid flow therethrough will be substantially unrestricted and substantially no actuating pressure will be applied to the clutch unit. It should also be noted that because of the provision of two generally parallel fluid flow paths around opposite axial sides of cam lobe 80 of valve core member 56 any axially directed forces exerted on the valve core member 56 from the fluid flow which could result in binding thereof so as to prevent or inhibit rotation of valve core member 56 are substantially balanced.

Once this reset operation has been completed and the location of valve core member 56 relative to the control circuit sequencing has been verified, low speed clock means 128 is actuated and operates to provide a signal to the forward drive means 122 so as to thereby begin advancing the stepping motor 98 in a forward direction which in turn will operate to begin moving the valve core member 56 out of the fully open position. During the initial movement of notch 82 on cam lobe 80 of valve core member 56 out of alignment with the inlet opening 42 the rate of increase of actuating fluid pressure applied to the clutch will be relatively high because relatively slight movement of the valve core member 56 will create a significant increase in the restriction of the inlet opening 42 thereby reducing the volume of fluid flowing through the pressure relief control valve 26.

Low speed clock means 128 will continue to signal the forward drive means 122 to provide driving pulses to the stepping motor 98 thereby further progressively closing pressure relief control valve 26 and increasing the actuating pressure applied to the clutch unit 20 until such time as the pressure sensing means 130 connected in conduit 24 signals pressure set means 132 that a predetermined actuating fluid pressure has been applied to clutch unit 20. This predetermined pressure may be set at any desired level but preferably will be at a pressure corresponding at least to a valve core member 56 position in which notch 82 provided on cam lobe 80 has been moved completely out of the area of the inlet opening 42. Thereafter, pressure set means 132 will deactivate low speed clock means 128 and activate a high speed clock means 134 which will continue to drive stepping motor 98 in a forward direction until the pressure relief control valve means 26 is moved into a fully closed position and full operating pressure is applied to the clutch unit 20. When full actuating pressure is applied to clutch unit 20 the alternating discs and plates will both be rotating at substantially the same speed so as to transmit the full driving power of the motor means to the driven apparatus.

As shown, the output of the high speed clock means 134 is also connected to the reverse drive means 124 via an inverter 136. Inverter 136 is incorporated in the circuitry because both forward and reverse drive means 122 and 124 are responsive to only positive gating signals. Thus, when it is desired to open pressure relief control valve 26, high speed clock means 134 will be activated to provide a series of negative pulses which will be supplied to both the forward and reverse drive means 122 and 124. However, because the polarity of the negative pulse will be changed to positive by inverter 136, only the reverse drive means 124 will be actuated so as to operate stepping motor 98 in a reverse or counterclockwise direction thereby causing the pressure relief control valve 26 to move sequentially from a fully closed position toward a fully open position resulting in increasing fluid flow therethrough and a decrease in actuating fluid pressure applied to the clutch unit 20.

The control system of the present invention is also provided with safety override means operative to abort a startup of the driven apparatus in the event of abnormal conditions such as may occur in the event the apparatus to be driven is jammed or overloaded.

The safety override means includes a first circuit means adapted to abort a startup in the event there is no rotational movement of the clutch unit output shaft after stepping motor 98 has advanced a predetermined number of steps. This circuit includes speed sensor means 138 associated with the output shaft of the clutch unit 20 which senses rotational movement thereof in response to which a signal is sent to a countercircuit means 140. Counter means 140 also receives the same pulses from the forward drive 122 as are being transmitted to the stepping motor 98. In the event counter means 140 has not received any signal from the speed sensor means 138 after the forward drive 122 has advanced the stepping motor 98 through a predetermined number of steps, counter means 140 will actuate the reverse drive 124 so as to pulse stepping motor 98 back to the start position in which the pressure relief control valve 26 is in a fully open position and substantially no actuating fluid pressure is being applied to clutch unit 20. If desired, counter means 140 may also operate to activate alarm means on a central remotely located annunciator panel so that the abnormality may be investigated and repairs effected.

The safety override means also includes circuitry operative to abort a startup in the event the driven apparatus is not accelerated to full operating speed within a predetermined time period such as may occur if the apparatus is overloaded for example. This circuitry includes full speed set means 142 which also receives a speed responsive signal from speed sensor means 138 which is compared to a predetermined full speed setting. If the signal from speed sensor means 138 fails to indicate that the apparatus has achieved full operating speed within a predetermined time period, full speed set means 142 will actuate reverse drive means 124 so as to pulse stepping motor 98 in a counterclockwise direction thereby moving the pressure relief control valve 26 into a fully open position and relieving the actuating fluid pressure being applied to clutch unit 20 so as to prevent possible damage to the clutch or other associated drive system components. The full speed set means 142 may also be tied into an alarm system whereby the need for corrective action may be signaled.

In operation, the pressure relief control valve assembly 26 and the associated control circuitry 120 will operate to enable clutch unit 20 to be actuated in such a manner as to provide a relatively "soft" start yet still allow relatively rapid engagement of the clutch plates and discs so as to minimize slippage and hence wear and frictional heating thereof. This drive system of the present invention is thus particularly well suited for a number of applications in which very large loads are encountered during startup such as for example conveyor systems. Additionally, the pressure relief control valve 26 of the present invention is particularly suited for use in areas of high dust or dirt contaminations in which the pressure actuating fluid may become contaminated therewith. Because the present pressure relief control valve utilizes a relatively large orifice plus the fact that it is designed to be driven in incremental discrete steps, it has been found to be substantially less susceptible to clogging or plugging as a result of highly contaminated fluid. Further, even when such clogging or plugging does occur such as during prolonged periods of operation with the valve in the fully closed position, the initial stepping motion of the valve toward the open position has resulted in rapid clearing of the contaminant accumulation thus providing precise reliable control.

Also, both the pressure relief control valve and the associated control circuitry may be easily fabricated at relatively low cost and yet provide a highly reliable and durable clutch control system which may be easily utilized in both single and multiple drive systems. For example, in overland conveyor systems which may extend for several miles and which may have a number of belt drive means spaced along the length thereof, it is necessary to sequence the startup of the drives so as to assure proper belt tensioning. This may be easily accomplished with the present control system by merely delaying the pulses to the respective stepping motors driving the pressure relief control valves of successive clutches by any number of counts necessary to enable proper belt tensioning. Additionally, the safety override means provides integral protection within the clutch control system which will abort startups and shut down the system under abnormal conditions so as to thereby prevent excessive slipping of the clutch unit which may result in premature failure thereof as well as other possible damage to the driven or driving equipment associated therewith.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:
1. A drive system comprising:
   driven means;
   motor means;
   fluid actuated clutch means selectively actuable to drivingly connect said motor means to said driven means; and
   control means for controlling the actuation of said clutch means, said control means including pressure relief fluid control valve means; and drive means operatively connected to control actuation of said valve means, said drive means being operative to progressively move said valve means from a first position to a second position at a first predetermined rate and to move said valve means from said second position to a third position at a second predetermined rate, said valve means being operative to progressively increase actuating pressure to said clutch means whereby said driven means may be accelerated at a first rate during movement of said valve means at said first predetermined rate and at a second rate during movement of said valve means at said second predetermined rate.

2. A drive system as set forth in claim 1 wherein one of said first and third positions is a fully open position and the other is a fully closed position.

3. A drive system as set forth in claim 2 wherein said drive system includes a means for supplying pressure actuating fluid to said clutch means and said pressure relief fluid control valve means is connected to said supply means and is operative to selectively enable said actuating fluid to bypass said clutch means.

4. A drive system as set forth in claim 3 wherein said control valve means is operative to allow said fluid to bypass said clutch means when in said fully open position.

5. A drive system as set forth in claim 3 wherein said pressure relief fluid control valve means includes a valve member rotatably movably disposed within a housing, said valve member having a cam surface provided thereon operative to control fluid flow through said valve means.

6. A drive system as set forth in claim 5 wherein said valve member includes a pair of axially spaced bearing journals provided thereon, said cam surface being positioned substantially centrally between said bearing journals.

7. A drive system as set forth in claim 6 wherein said valve housing has a pair of spaced fluid outlets, each of said outlet openings being positioned between one of said bearing journals and said cam surface whereby axially directed forces exerted on said valve member by fluid flow therethrough are substantially balanced.

8. A drive system as set forth in claim 7 wherein said housing has an inlet opening positioned in radial alignment with said cam surface and said cam surface includes a first portion having a notch positionable in radial alignment with said inlet opening so as to allow substantially unrestricted fluid flow through said valve means.

9. A drive system as set forth in claim 8 wherein said cam surface includes a second portion having a substantially constant rate of rise.

10. A drive system as set forth in claim 1 wherein said drive means includes valve motor means drivingly connected to said valve means and associated control circuitry for selectively energizing said valve motor means.

11. A drive system as set forth in claim 10 wherein said valve motor means is a reversible stepping motor.

12. A drive system as set forth in claim 10 wherein said first predetermined rate is less than said second predetermined rate.

13. A drive system as set forth in claim 12 wherein said second position corresponds to a predetermined actuating fluid pressure being applied to said clutch unit.

14. A drive system as set forth in claim 13 wherein said drive means includes pressure sensing means for sensing said actuating fluid pressure applied to said clutch means.

15. A drive system as set forth in claim 10 wherein said control circuitry includes forward drive circuit means for driving said valve means from said first position to said third position and reverse drive means for driving said valve means from said third position to said first position.

16. A drive system as set forth in claim 15 wherein said control circuitry means includes safety override means operative to actuate said reverse drive means whereby actuating fluid pressure to said clutch means is decreased in response to a sensed abnormal condition.

17. A drive system as set forth in claim 16 wherein said abnormal condition corresponds to non-rotation of the output shaft of said clutch means.

18. A drive system as set forth in claim 16 wherein said abnormal condition corresponds to a sensed speed of rotation of the output shaft of said clutch means less than a predetermined speed.

19. A drive system as set forth in claim 1, wherein said drive means comprises an overland conveyor system and said drive system includes a plurality of motor means positioned in spaced relationship along said conveyor system, a plurality of fluid actuated clutch means for drivingly connecting each of said motor means to said conveyor system, and control means for controlling actuation of said clutch means for each of said plurality of clutch means.

20. A drive system as set forth in claim 19 wherein said control circuitry is operative to progressively actuate each of said valve means at a predetermined rate whereby each of said clutch means will be successively actuated.

21. A drive system as set forth in claim 20 wherein said drive means is a stepping motor and said control circuitry comprises:

first circuit means connected to said stepping motor for driving said stepping motor through said predetermined number of steps in a first direction;

second circuit means connected to said stepping motor for driving said stepping motor through said predetermined number of steps in the second direction;

resetting circuit means operative to drive said stepping motor through said predetermined number of steps in one of said first and second directions upon energization of said control means;

low speed circuit means operative to control said first circuit means so as to drive said stepping motor through a portion of said predetermined number of steps in another of said first and second directions at a low speed whereby said valve means will operate to gradually apply actuating pressure to said clutch means so as to slowly accelerate said driven means; and high speed circuit means also operative to control said first circuit means so as to drive said stepping motor in said another direction and through the remaining portion of said predetermined number of steps at a higher speed whereby said valve means will operate to increase said actuating pressure applied to said clutch, said high speed circuit means being actuated in response to a predetermined sensed condition being achieved within said clutch.

22. In a drive system including driven means, motor means, fluid actuated clutch means operative to selectively drivingly connect said motor means to said driven means, valve means for selectively applying actuating fluid pressure to said clutch means and control means for controlling operation of said valve means, said control means comprising:

a stepping motor operative to drive said valve means through a predetermined number of steps so as to move said valve means between open and closed positions;

first circuit means connected to said stepping motor for driving said stepping motor through said predetermined number of steps in a first direction;

second circuit means connected to said stepping motor for driving said stepping motor through said predetermined number of steps in the second direction;

resetting circuit means operative to drive said stepping motor through said predetermined number of steps in one of said first and second directions upon energization of said control means;

low speed circuit means operative to control said first circuit means so as to drive said stepping motor through a portion of said predetermined number of steps in another of said first and second directions at a low speed whereby said valve means will operate to gradually apply actuating pressure to said clutch means so as to slowly accelerate said driven means; and high speed circuit means also operative to control said first circuit means so as to drive said stepping motor in said another direction and through the remaining portion of said predetermined number of steps at a higher speed whereby said valve means will operate to increase said actuating pressure applied to said clutch, said high speed circuit means being actuated in response to a predetermined sensed condition being achieved within said clutch.

23. A drive system as set forth in claim 22 wherein said control means further includes safety override means operative to actuate one of said first and second circuit means whereby said stepping motor may operate to drive said valve means into one of said open or closed positions in response to a sensed abnormal condition.

24. A drive system as set forth in claim 23 wherein said control means includes speed sensing means operative to sense the speed of rotation of an output shaft of said clutch means.

25. A drive system as set forth in claim 24 wherein said sensed abnormal condition corresponds to non-rotation of said output shaft.

26. A drive system as set forth in claim 24 wherein said sensed condition corresponds to a speed of rotation of said output shaft less than a predetermined speed.

27. A drive system as set forth in claim 22 further comprising pressure sensing means operative to sense the pressure of said actuating fluid being applied to said clutch means, said pressure sensing means being operative to actuate said high speed circuit means in response to a sensed predetermined pressure.

* * * * *